(12) United States Patent
Tadahira et al.

(10) Patent No.: US 11,450,217 B2
(45) Date of Patent: Sep. 20, 2022

(54) DEVICE FOR COLLECTING AIRCRAFT OPERATION HISTORY INFORMATION

(71) Applicant: Nihon Onkyo Engineering Co., Ltd., Tokyo (JP)

(72) Inventors: Yoshio Tadahira, Tokyo (JP); Osamu Kohashi, Tokyo (JP); Hiroshi Wada, Tokyo (JP); Takahiro Mizuno, Tokyo (JP); Kazuki Tamura, Tokyo (JP)

(73) Assignee: Nihon Onkyo Engineering Co., Ltd.

( * ) Notice: Subject to any disclaimer, the term of this patent is extended or adjusted under 35 U.S.C. 154(b) by 0 days.

(21) Appl. No.: 16/650,991

(22) PCT Filed: Dec. 19, 2017

(86) PCT No.: PCT/JP2017/045418
§ 371 (c)(1),
(2) Date: Mar. 26, 2020

(87) PCT Pub. No.: WO2019/123526
PCT Pub. Date: Jun. 27, 2019

(65) Prior Publication Data
US 2020/0357291 A1    Nov. 12, 2020

(51) Int. Cl.
*G08G 5/00* (2006.01)
*G06T 7/246* (2017.01)
*G06V 10/10* (2022.01)

(52) U.S. Cl.
CPC ........... *G08G 5/0082* (2013.01); *G06T 7/251* (2017.01); *G06V 10/10* (2022.01); *G06T 2207/30241* (2013.01)

(58) Field of Classification Search
CPC combination set(s) only.
See application file for complete search history.

(56) References Cited

U.S. PATENT DOCUMENTS 4,163,283 A * 7/1979 Darby .................. G01P 3/66
                                              701/120
5,675,661 A * 10/1997 Richman ............ B64F 1/002
                                              382/104
(Continued)

FOREIGN PATENT DOCUMENTS

CN      102099843 A     6/2011
CN      102417037 A     4/2012
(Continued)

OTHER PUBLICATIONS

Kim, "Automatic Aircraft Recognition and Identification", 2005, University of Wollongong Thesis Collections, https://ro.uow.edu.au/cgi/viewcontent.cgi?filename=0&article=1499&context=theses&type=additional (Year: 2005).*
(Continued)

*Primary Examiner* — Zhiyu Lu
(74) *Attorney, Agent, or Firm* — Lerner, David, Littenberg, Krumholz & Mentlik, LLP

(57) ABSTRACT

Operation history information on every aircraft can be collected, and efficiency in collection of the aircraft operation history information can be improved. The present invention includes: an image acquisition unit 11 configured to acquire an image G obtained by imaging a route R or A2; an image-type model identification unit 21 configured to identify a model of an aircraft P in the route R or A2 based on appearance data of an aircraft Q in the image G acquired by the image acquisition unit 11 and aircraft appearance samples previously prescribed for respective models; and an operation history storage unit 45 configured to store image-derived model information identified by the image-type model identification unit 21.

10 Claims, 8 Drawing Sheets

(56) References Cited

U.S. PATENT DOCUMENTS

| | | | |
|---|---|---|---|
| 11,325,619 B2* | 5/2022 | Suarez Ajo | E01C 1/04 |
| 2004/0117144 A1 | 6/2004 | Ohhashi et al. | |
| 2009/0257314 A1* | 10/2009 | Davis | G01S 5/18 367/125 |
| 2015/0199802 A1* | 7/2015 | Freeman | H04N 5/23229 348/129 |
| 2016/0189002 A1* | 6/2016 | Kawakami | G06T 7/001 382/218 |
| 2017/0186175 A1 | 6/2017 | Kumeno et al. | |
| 2017/0309072 A1 | 10/2017 | Li et al. | |
| 2020/0168105 A1* | 5/2020 | Zosel | G08G 5/0069 |
| 2020/0373998 A1* | 11/2020 | Nordlow | H04B 7/18506 |

FOREIGN PATENT DOCUMENTS

| | | | | |
|---|---|---|---|---|
| CN | 103065504 A | 4/2013 | | |
| CN | 103065505 A | 4/2013 | | |
| CN | 103065506 A | 4/2013 | | |
| CN | 105302151 A | 2/2016 | | |
| CN | 105501457 A | 4/2016 | | |
| CN | 106504588 A | 3/2017 | | |
| CN | 106846920 A | 6/2017 | | |
| CN | 107045805 A | 8/2017 | | |
| CN | 107230392 A | 10/2017 | | |
| EP | 3144922 A1 | 3/2017 | | |
| JP | S63308523 A | 12/1988 | | |
| JP | H0763559 A | 3/1995 | | |
| JP | H0966900 | * | 3/1997 | B64F 1/18 |
| JP | H0966900 A | 3/1997 | | |
| JP | H09304065 A | 11/1997 | | |
| JP | 2003329510 A | 11/2003 | | |
| JP | 2008097454 A | 4/2008 | | |
| JP | 201361155 A | 4/2013 | | |
| JP | 2016192007 A | 11/2016 | | |
| JP | 2017072557 A | 4/2017 | | |
| JP | 2017198647 A | 11/2017 | | |
| WO | 02052526 A1 | 7/2002 | | |
| WO | 2015170776 A1 | 11/2015 | | |

OTHER PUBLICATIONS

International Search Report from Application No. PCT/JP2017/045418 dated Jan. 23, 2018, 1 page.
International Search Report for Application No. PCT/JP2018/010253, dated May 1, 2018, pp. 1-2.
Chinese Search Report and Office Action for Application No. 201780094855.7, dated Jul. 28, 2021, 11 pages.
Korean Office Action for Application No. 10-2020-7007123 dated Nov. 12, 2021, 4 Pages.

* cited by examiner

DEVICE FOR COLLECTING AIRCRAFT OPERATION HISTORY INFORMATION

CROSS-REFERENCE TO RELATED APPLICATION

The present application is a national phase entry under 35 U.S.C. § 371 of International Application No. PCT/JP2017/045418 filed Dec. 19, 2017, which is incorporated herein by reference.

TECHNICAL FIELD

The present invention relates to a device configured to collect aircraft operation history information.

BACKGROUND ART

A local government, such as of a prefecture, the Ministry of Defense, an airport administration organization, or the like monitors aircraft (for example, airplanes, helicopters, and Cessna planes) passing through a specific flight route, and collects operation history information on the aircraft passing through the flight route in some cases. To collect the aircraft operation history information by the local government, the Ministry of Defense, the airport administration organization, or the like (hereinafter, referred to as "aircraft monitoring organization"), dedicated staff having knowledge to identify various aircraft models (for example, A380, B747, F-35, and V-22), requires a lot of labor. Accordingly, collection of aircraft operation history information is a burden on the aircraft monitoring organization.

To reduce such a burden, various technologies to efficiently identify the model of the aircraft (hereinafter, referred to as "aircraft identification technology") have been proposed. As one example of the aircraft identification technologies which have been proposed, there is a technology that intercepts an identification radio wave such as a transponder response signal radio wave transmitted from the aircraft, and identifies the model of the aircraft based on the intercepted identification radio wave (for example, see Patent Literatures 1 and 2).

As another example of the aircraft identification technologies which have been proposed, there is a technology that acquires an image of a flying object such as an aircraft by a laser radar in a case in which a sound wave generated from the flying object is detected, and identifies the flying object based on the acquired image of the flying object (for example, see Patent Literature 3). Furthermore, as yet another example of the aircraft identification technologies which have been proposed, there is a technology that captures an image of a moving object by an imaging device such as a monitoring camera, generates moving object information based on a contour line of the moving object in the captured image, and estimates presence/absence, a type, and a posture of a detection target such as an aircraft and a bird based on the moving object information (for example, see Patent Literature 4).

CITATION LIST

Patent Literature

[Patent Literature 1] JP S63-308523 A
[Patent Literature 2] WO 02/052526 A1
[Patent Literature 3] JP 2017-72557 A
[Patent Literature 4] WO 2015/170776 A1

SUMMARY OF INVENTION

Technical Problem

A helicopter, a Cessna plane, and the like among commercial aircraft, do not transmit an identification radio wave in most cases, and military aircraft also do not transmit identification radio wave in most cases. A device transmitting the identification radio wave in the aircraft may be out of order. In such a case, even when the above-described one example of the aircraft identification technologies is used, the identification radio wave cannot be received, which makes it difficult to identify the model of the aircraft. Accordingly, it is desirable to identify the models of every aircraft including aircraft that do not transmit the identification radio wave.

Even when the above-described another example or the above-described still another example of the aircraft identification technologies is used, it is only possible to acquire the image of the passing aircraft and to identify the aircraft in the acquired image. Therefore, the aircraft operation history information cannot be efficiently collected. Accordingly, in the aircraft monitoring organization, dedicated staff must collect the aircraft operation history information and this requires a lot of labor. In particular, to collect the operation history information on aircraft flying at night, it is desirable to continuously monitor passage states of the aircraft for 24 hours; however, deployment of dedicated staff at night is a burden on the aircraft monitoring organization. Thus, to reduce such a burden, it is desirable to efficiently collect the aircraft operation history information.

In views of the above-described circumstances, it is desirable to provide a device for collecting the aircraft operation history information that can collect the operation history information on every aircraft and can improve efficiency in collection of the aircraft operation history information.

Solution to Problem

To solve the above-described issues, a device for collecting aircraft operation history information according to an aspect is a device configured to collect aircraft operation history information, and includes: an image acquisition unit configured to acquire an image obtained by imaging a specific route; an image-type model identification unit configured to identify a model of an aircraft in the route based on: appearance data of an aircraft in the image acquired by the image acquisition unit; and aircraft appearance samples previously prescribed for respective models; and an operation history storage unit configured to store image-derived model information identified by the image-type model identification unit.

Advantageous Effects of Invention

The device for collecting the aircraft passage state according to an aspect can collect the operation history information on every aircraft, and can improve efficiency in collection of the aircraft operation history information.

DESCRIPTION OF EMBODIMENTS

Figure 1:
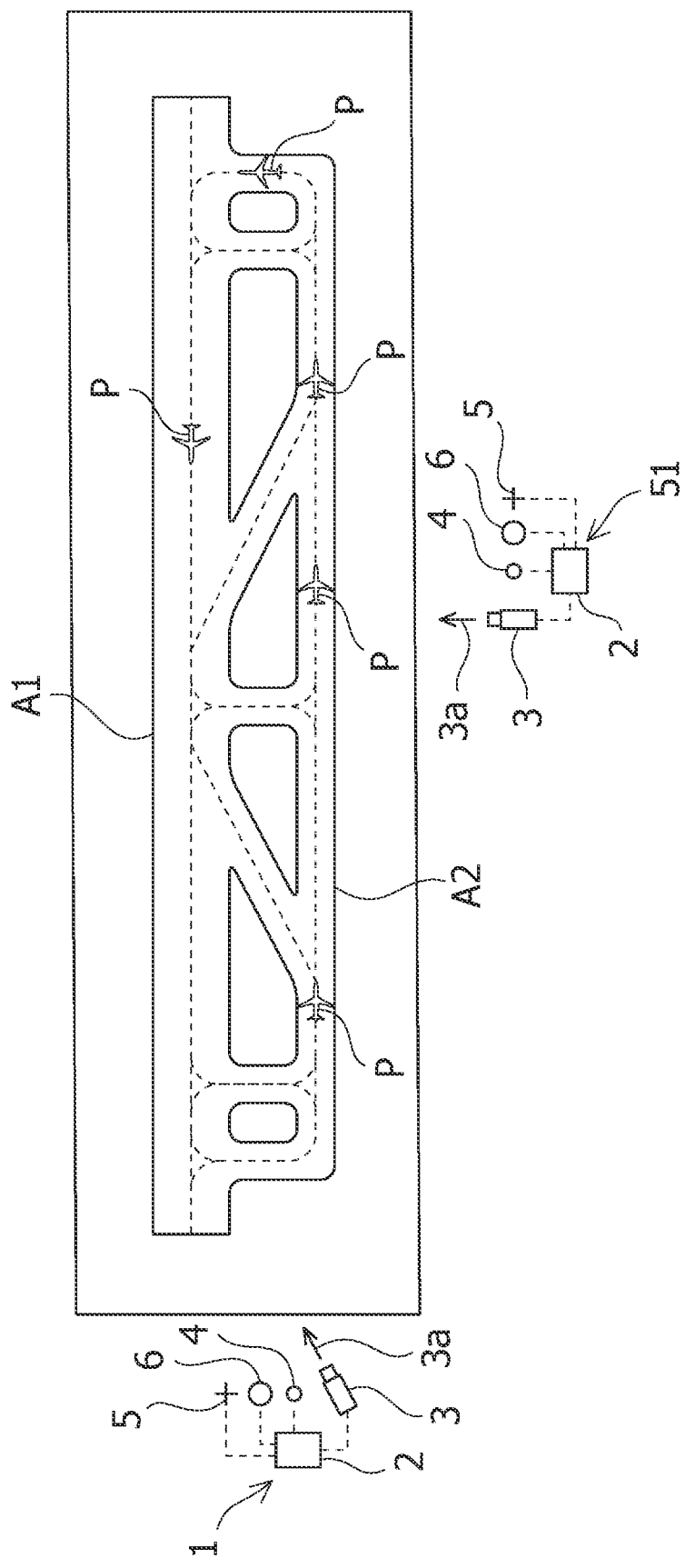
FIG. 1 is a plan view schematically showing an example of a state in which systems for collecting aircraft operation history information according to the First Embodiment and the Second Embodiment are installed.

Systems for collecting aircraft operation history information (hereinafter, simply referred to as "collection systems" as necessary) according to First and Second Embodiments are described. Note that, in the collection systems according to the First and Second Embodiments, aircraft, for which operation history information is to be collected, may be, for example, an airplane, a helicopter, a Cessna plane, an airship, a drone, and/or the like. The aircraft, however, is not limited thereto as long as the aircraft is a machine having flight capability.

Furthermore, in the present specification, a model of an aircraft may be a model number determined by a manufacturer of the aircraft. Examples of the model of the aircraft include A380, B747, F-35, V-22, and the like. The model of the aircraft, however, is not limited thereto, and classification sufficient to identify whether or not the aircraft can pass through a specific route is sufficient.

In the present specification, the aircraft may be affiliated with an organization that administers or operates the aircraft. The aircraft is affiliated with, for example, an airline company, a military establishment, and/or the like. Furthermore, the aircraft may be affiliated with a private organization, an army, and/or the like.

In the present specification, deformation modes of the aircraft may correspond to various deformation states based on an operation state of the aircraft. For example, in a case in which the aircraft is an airplane, a deformation mode is a takeoff/landing mode in which tires of the aircraft protrude to outside of the aircraft, or a flight mode in which the tires of the aircraft are retracted inside the aircraft. For example, in a case in which the aircraft is an Osprey, more specifically, the model of the aircraft is V-22, the deformation mode is a fixed wing mode in which an engine nacelle is substantially horizontal, a vertical takeoff/landing mode in which the engine nacelle is substantially vertical, or a transition mode in which the engine nacelle is inclined.

First Embodiment

The collection system according to the First Embodiment will be described.

"Collection System"

A collection system 1 according to the First Embodiment is described with reference to FIG. 1 to FIG. 4. Note that FIG. 3 and FIG. 4 each shows a moving trajectory of one aircraft P along a route R. As shown in FIG. 1 to FIG. 4, the collection system 1 includes a device for collecting the aircraft operation history information (hereinafter, simply referred to as "collection device" as necessary) 2 configured to collect operation history information on various aircraft P passing through the route R.

The collection system 1 further includes an imaging device 3, a noise detection device 4, a radio wave reception device 5, and a sound source search device 6. The imaging apparatus 3 is configured to capture an image G of the route R. The noise detection device 4 is configured to detect a noise level of the route R and its periphery. The radio wave reception device 5 is configured to receive a radio wave from the aircraft P passing through the route R. The sound source search device 6 is configured to specify an arrival direction of sound from a sound source in all directions and to estimate sound intensity of the sound source in the route R and its periphery. The imaging device 3, the noise detection device 4, the radio wave reception device 5, and the sound source search device 6 are electrically connected to the collection device 2.

Figure 3:
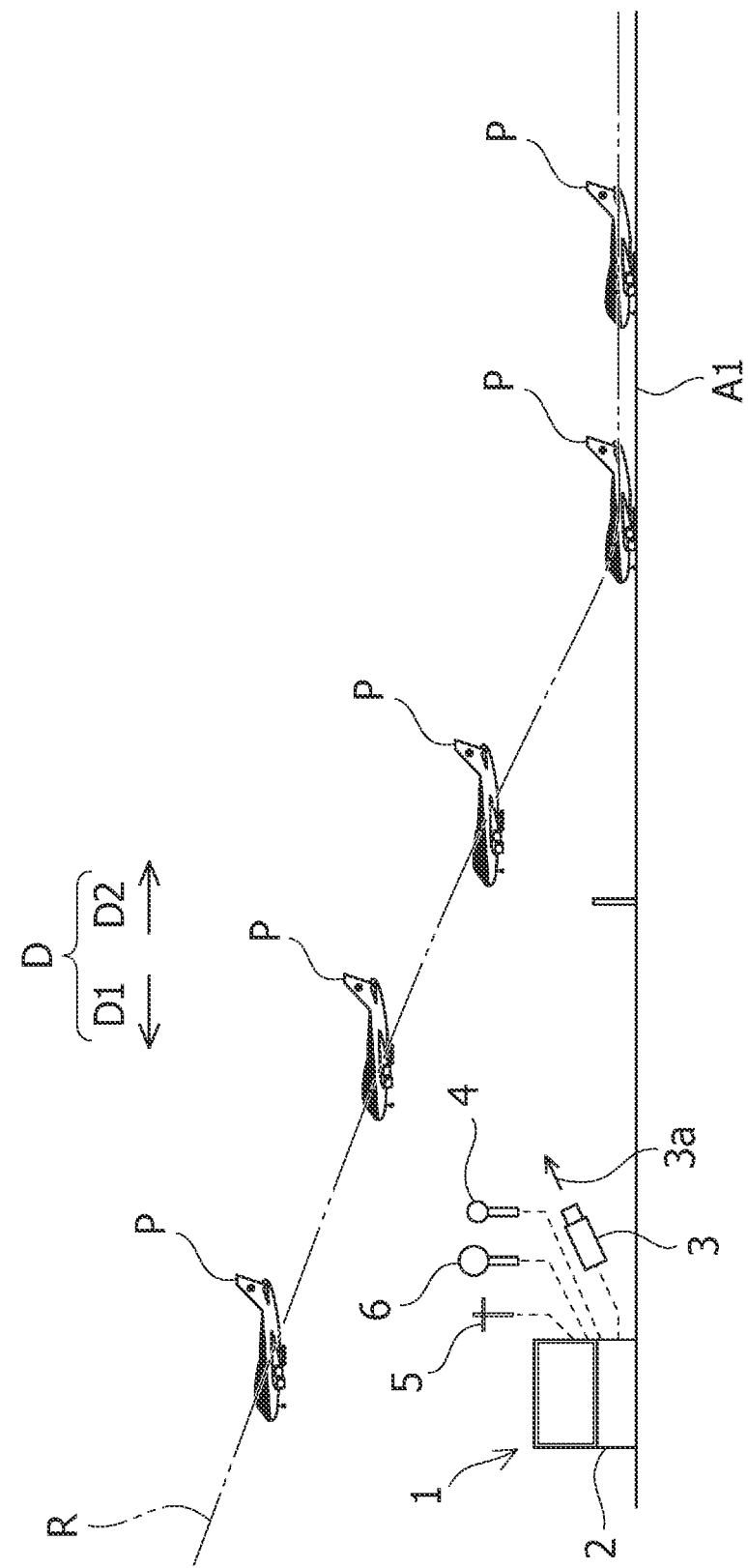
FIG. 3 is a diagram to explain collection of aircraft operation history in takeoff by the collection system according to the First Embodiment.
Figure 4:
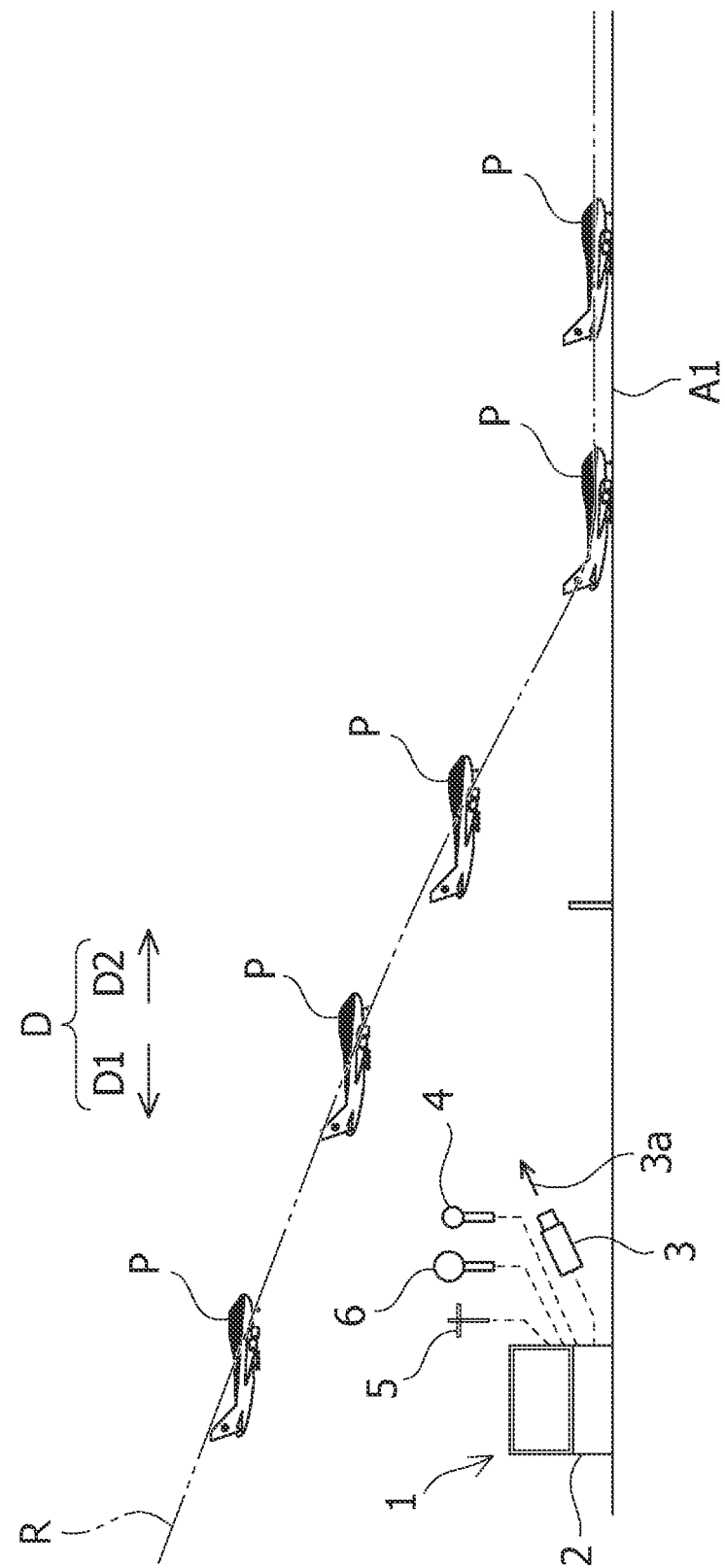
FIG. 4 is a diagram to explain collection of the aircraft operation history in landing by the collection system according to the First Embodiment.

As shown in FIG. 1, FIG. 3, and FIG. 4, the collection system 1 is installed so as to collect the operation history information on the aircraft P that passes through the route R in the air, namely, the flight route R. For example, the collection system 1 may be installed near a runway A1 extending substantially linearly. More specifically, the collection system 1 may be installed at a position separated from the runway A1 on one side in the extending direction of the runway A1. Note that, in the collection system, the collection device may be installed separately from installation positions of the imaging device, the noise detection device, the radio wave reception device, and the sound source search device. For example, the collection device may be installed at a remote place separate from the installation positions of the imaging device, the noise detection device, the radio wave reception device, and the sound source search device. In this case, the collection device may be connected to the imaging device, the noise detection device, the radio wave reception device, and the sound source search device by wireless communication or wired communication.

"Details of Imaging Device, Noise Detection Device, Radio Wave Reception Device, and Sound Source Search Device"

First, details of the imaging device 3, the noise detection device 4, the radio wave reception device 5, and the sound source search device 6 will be described. As shown in FIG. 3 and FIG. 4, the imaging device 3 is installed such that an imaging direction 3a is directed to the flight route R. In particular, the imaging direction 3a may be directed to the runway A1 in addition to the flight route R. Furthermore, the imaging device 3 may be fixed such that the imaging direction 3a is fixed.

Figure 5:
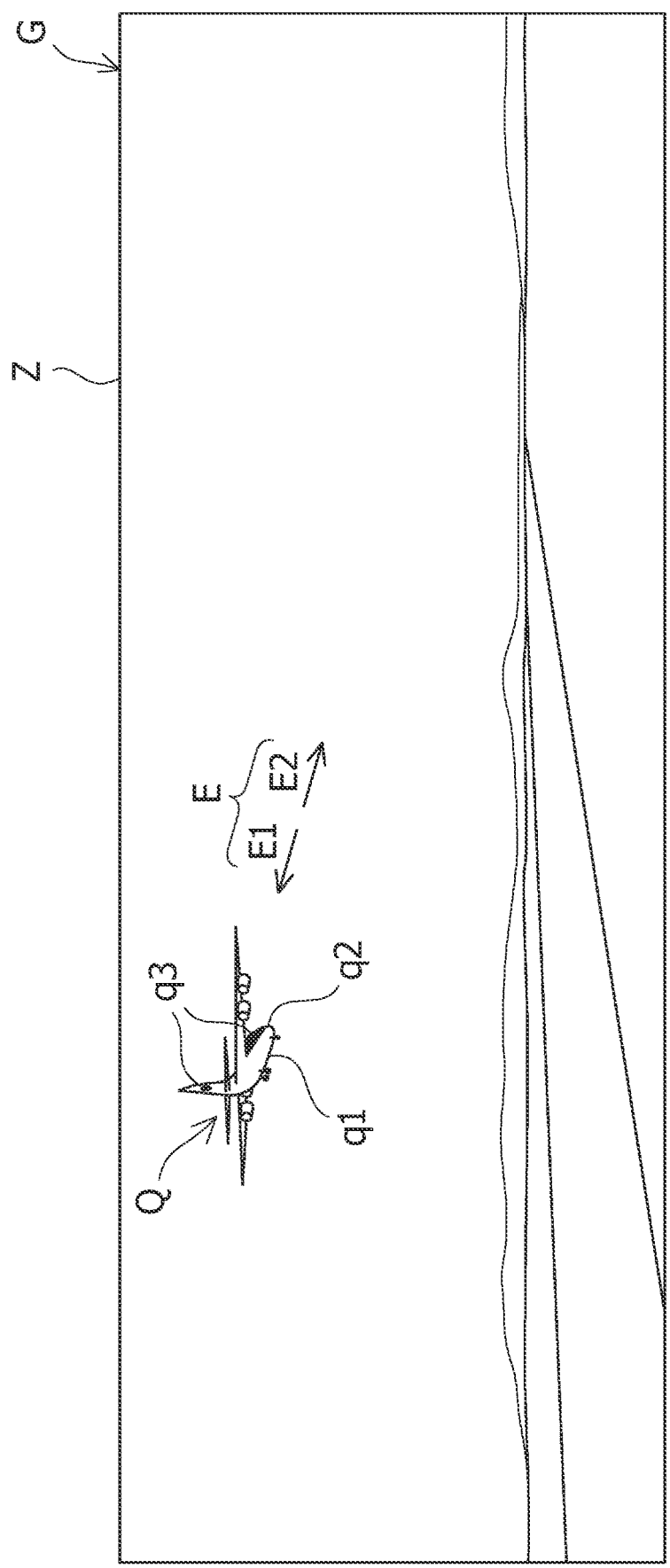
FIG. 5 is a schematic view showing an example of an image used by a collection device according to the First Embodiment.

As shown in FIG. 5, the imaging device 3 is configured to capture a predetermined imaging range Z at predetermined imaging time intervals, and to acquire an image G obtained by imaging the imaging range Z. In a case in which the imaging device performs imaging a plurality of times at the imaging time intervals, a lower limit of the imaging time interval is determined based on a consecutive imageable speed of the imaging device 3, and an upper limit of the imaging time interval is determined so as to acquire the image G of two or more frames obtained by imaging the same aircraft P passing through the predetermined route in the imaging range Z. As an example, the imaging time interval may be set to approximately one second.

Such an imaging device 3 may be a digital camera configured to acquire a still image. Furthermore, the imaging device 3 may be configured to acquire a moving image in addition to a still image. In particular, the imaging device 3 may be a low-illuminance camera. In this case, the imaging device 3 can accurately image the aircraft P flying at night. Note that the collection system may include a plurality of imaging devices. In this case, using a plurality of images acquired by the plurality of imaging devices makes it possible to improve collection accuracy of the aircraft operation history information in the collection system.

The noise detection device 4 may include at least one microphone that is configured to measure sound pressure. For example, the microphone may be a nondirectional microphone. Furthermore, the noise detection device 4 may be configured to calculate acoustic intensity. The radio wave reception device 5 may include an antenna that is configured to receive a radio wave such as a transponder response signal radio wave and/or the like. The sound source search device 6 may be configured such that specification of an arrival direction of sound from a sound source in all directions and estimation of sound intensity of the sound source are performed at a time by a directional filter function. The sound source search device 6 may include a spherical baffle microphone.

"Details of Collection Device"

Details of the collection device 2 according to the present Embodiment will be described. Although not particularly shown, the collection device 2 includes an arithmetic component such as: a CPU (Central Processing Unit); a control component; a storage component such as a RAM (Random Access Memory), an HDD (Hard Disc Drive), and/or the like; a wireless or wired input connection component; a wired or wireless output connection component; a wired or wireless input/output connection component; and/or the like. For example, each of the imaging device 3, the noise detection device 4, the radio wave reception device 5, and the sound source search device 6 may be electrically connected to the collection device 2 through the input connection component or the input/output connection component.

The collection device 2 further includes a circuit electrically connected to these components. The collection device 2 includes: an input device such as a mouse, a keyboard, and/or the like; and an output device such as a display, a printer, and/or the like. The collection device 2 may include an input/output device such as a touch panel and/or the like. The collection device 2 is operable by the input device or the input/output device. The collection device 2 can display an output result and the like on the output device.

The collection device 2 is configured to perform arithmetic operation or control for: a data acquisition function; a determination function; a calculation function; an identification function; an estimation function; a correction function; a setting function; a storage function; and the like, with use of: the arithmetic component; the control component; and the like. The collection device 2 is configured to store or record data used in arithmetic operation or control, an arithmetic result, and the like, in the storage component. The collection device 2 is configured such that the setting and the like are changeable by the input device or the input/output device. The collection device 2 is configured to display the information stored or recorded in the storage component, on the output device or the input/output device.

Figure 2:
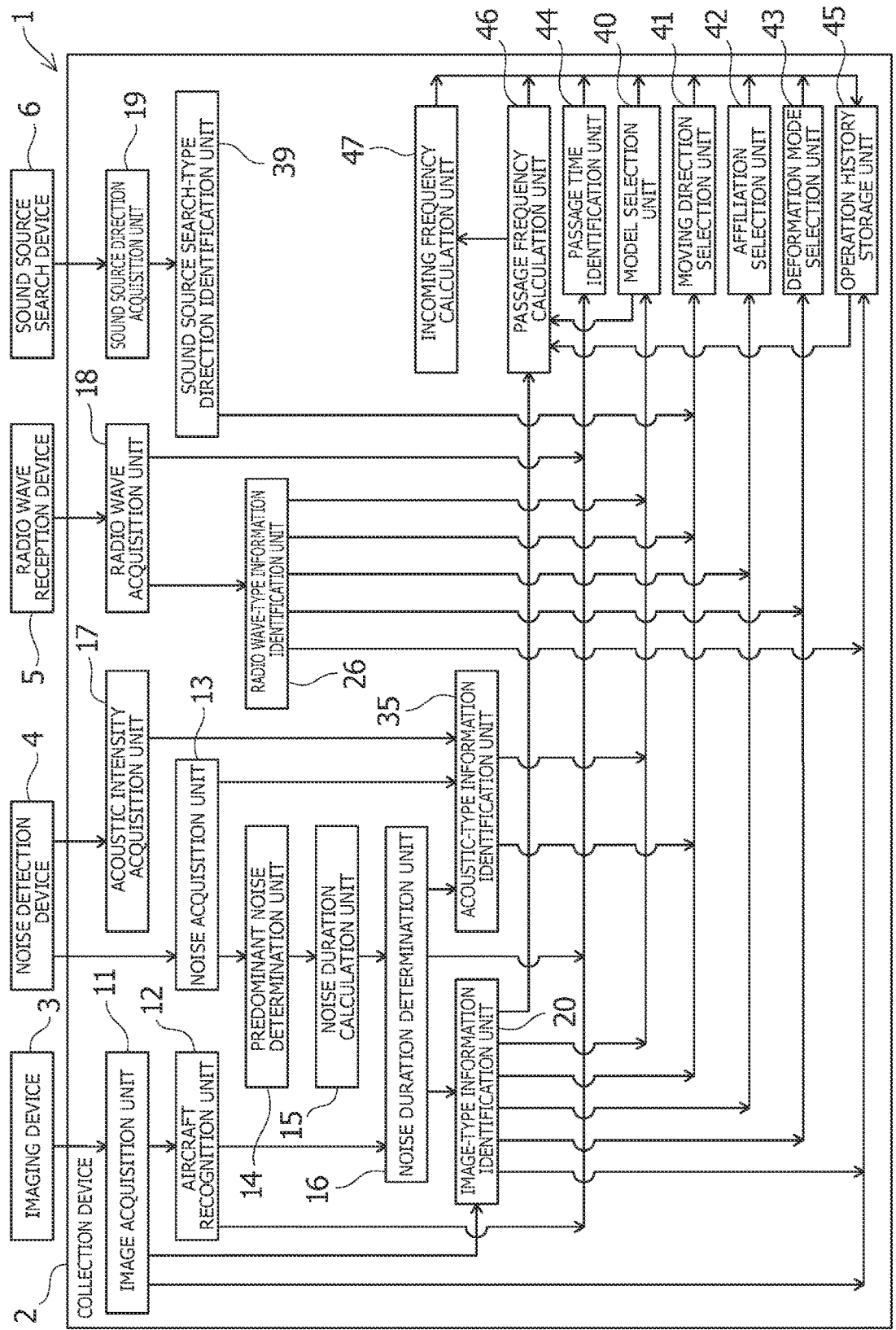
FIG. 2 is a configuration diagram of the system for collecting the aircraft operation history information according to the First Embodiment.

As shown in FIG. 2, such a collection device 2 includes an image acquisition unit 11 that is electrically connected to the imaging device 3. The image acquisition unit 11 acquires the image G captured by the imaging device 3. In particular, the image acquisition unit 11 may acquire the image G of a plurality of frames captured by the imaging device 3. As shown in FIG. 5, such an image acquisition unit 11 can acquire the image G including an aircraft Q when the aircraft P passes through the flight route R.

The collection device 2 includes an aircraft recognition unit 12 that is configured to recognize presence of the aircraft Q in the image G acquired by the image acquisition unit 11. The aircraft recognition unit 12 may be configured to recognize presence of the aircraft Q in a case in which an object changed in position among the plurality of images G, in particular, between the two images G acquired by the image acquisition unit 11, is recognized.

The collection device 2 includes a noise acquisition unit 13 that is electrically connected to the noise detection device 4. The noise acquisition unit 13 is configured to acquire a noise level detection value detected by the noise detection device 4. Accordingly, the noise acquisition unit 13 can acquire the noise level detection value from the aircraft P in the flight route R.

The collection device 2 includes a predominant noise determination unit 14 that determines whether or not a predominant noise state has occurred. In the predominant noise state, the noise level detection value (noise level acquisition value) acquired by the noise acquisition unit 13 exceeds a noise level threshold. The predominant noise determination unit 14 can be configured by a learned artificial intelligence model. In this case, the learned artificial intelligence model can be constructed by inputting test samples such as a plurality of noise level acquisition value samples prescribed for respective models, and/or the like, as learning data. Furthermore, in the predominant noise determination unit 14, the sound level threshold is manually or automatically changeable based on a regulation level of the flight noise, the installation state of the collection system 1, and the like. In particular, in a case of using the learned artificial intelligence model, additional test samples may be input to the learned artificial intelligence model, and the noise level threshold may be accordingly automatically changed.

The collection device 2 includes a noise duration calculation unit 15 that calculates duration of the predominant noise state in a case in which the predominant noise determination unit 14 determines that the predominant noise state has occurred. The collection device 2 further includes a noise duration determination unit 16 that determines whether or not a duration calculation value calculated by the noise duration calculation unit 15 has exceeded a duration threshold. The noise duration determination unit 16 can be configured by a learned artificial intelligence model. In this case, the learned artificial intelligence model can be constructed by inputting test samples such as the plurality of model samples, and duration samples of the plurality of predominant noise states prescribed for the respective models, and/or the like, as learning data. Furthermore, in the noise duration determination unit 16, the duration threshold is manually or automatically changeable. In particular, in a case of using the learned artificial intelligence model, additional test samples may be input to the learned artificial intelligence model, and the duration threshold may be accordingly automatically changed.

The collection device 2 includes an acoustic intensity acquisition unit 17 that is configured to acquire an acoustic intensity calculation value calculated by the noise detection device 4. The collection device 2 includes a radio wave acquisition unit 18 that is electrically connected to the radio wave reception device 5. The radio wave acquisition unit 18 is configured to acquire a radio wave signal received by the radio wave reception device 5 (hereinafter, referred to as "received radio wave signal" as necessary). Accordingly, in a case in which the aircraft P in the flight route R transmits the radio wave, the radio wave acquisition unit 18 can acquire the radio wave signal. The collection device 2 further includes a sound source direction acquisition unit 19 that is electrically connected to the sound source search device 6. The sound source direction acquisition unit 19 is configured to acquire information on the arrival direction of the sound from the sound source (hereinafter, referred to as "sound source direction information") specified by the sound source search device 6.

Figure 6:
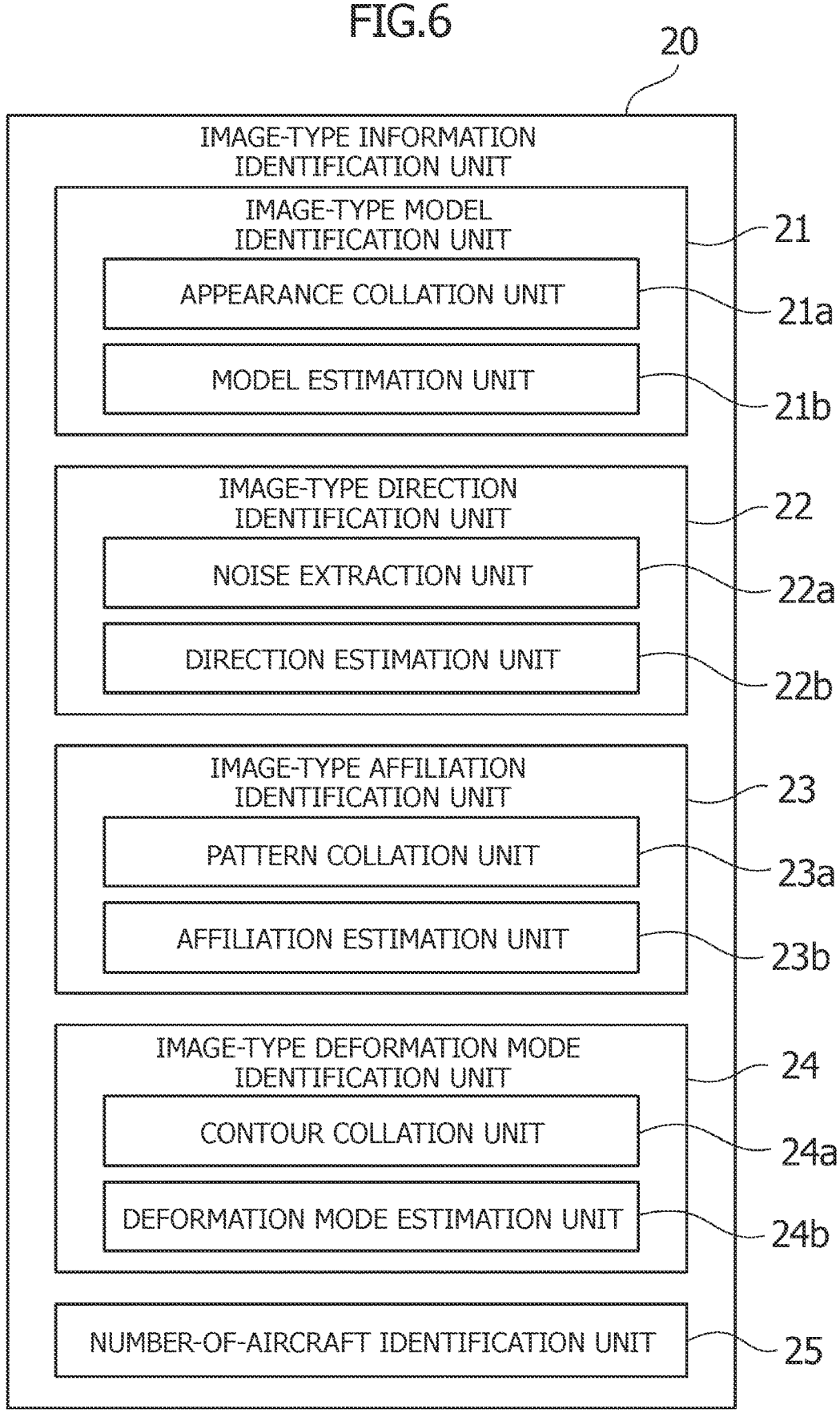
FIG. 6 is a configuration diagram of an image-type information identification unit in the device for collecting the aircraft operation history information according to the First Embodiment.

As shown in FIG. 2 and FIG. 6, the collection device 2 includes an image-type information identification unit 20 that is configured to identify various kinds of information based on the image G acquired by the image acquisition unit 11. As shown in FIG. 5 and FIG. 6, the image-type information identification unit 20 includes an image-type model identification unit 21 that identifies the model of the aircraft P in the flight route R based on appearance data of the aircraft Q in the image G acquired by the image acquisition unit 11 and aircraft appearance samples prescribed for the respective models. In the image-type model identification unit 21, the plurality of aircraft appearance samples previously prescribed for the plurality of models may be used in order to identify the plurality of models.

The appearance data may include contour data q1 of the aircraft Q in the image G, pattern data of a surface of the aircraft Q, color data of the surface of the aircraft Q, and the like. Each of the appearance samples may include an aircraft contour sample previously prescribed for each model, a pattern sample of the surface of the aircraft, a color sample of the surface of the aircraft, and the like. For example, the image-type model identification unit 21 may collate the contour data q1 of the aircraft Q in the image G with the plurality of contour samples, and identifies a model corresponding to a contour sample high in matching rate with the contour data q1 in the collation, as the model of the aircraft P in the flight route R.

Furthermore, a combination of the contour sample and at least one of the pattern sample and the color sample may be previously prescribed for each model. In this case, the image-type model identification unit collates the appearance data obtained by combining the contour data and at least one of the pattern data and the color data, with the plurality of appearance samples each obtained by combining the contour sample and at least one of the pattern sample and the color sample. The image-type model identification unit may identify a model corresponding to the appearance sample highest in matching rate with the appearance data in the collation, as the model of the aircraft in the flight route.

In a case in which the aircraft appearance samples previously prescribed for the respective models do not include an appearance sample matching with the appearance data of the aircraft Q or only include a sample extremely low in matching rate with the appearance data of the aircraft Q, the image-type model identification unit 21 may identify the model of the aircraft P in the flight route R as an "unidentified flying object". Note that the image-type model identification unit may identify the model of the aircraft in the flight route based on the appearance data of the aircraft in the plurality of images acquired by the image acquisition unit and the aircraft appearance samples previously prescribed for the respective models. In this case, the model of the aircraft in the flight route may be identified based on an image that is the highest in matching rate between the appearance data and the appearance sample among the plurality of images. Such an image-type model identification unit 21 may include an appearance collation unit 21a that collates the appearance data with the appearance samples, and a model estimation unit 21b that estimates the model of the aircraft P in the flight route R based on a result of the collation by the appearance collation unit 21a.

Such an image-type model identification unit 21 can be configured by a learned artificial intelligence model. In this case, the learned artificial intelligence model can be constructed by inputting test samples such as the plurality of appearance samples prescribed for the respective models, and/or the like, as learning data. Note that, in a case of using the learned artificial intelligence model, additional test samples may be input to the learned artificial intelligence model, and a matching condition between the appearance data and the appearance sample, for example, a counter matching condition, may be accordingly corrected.

Furthermore, in a case in which the aircraft recognition unit 12 recognizes presence of the aircraft Q in the image G, the image-type model identification unit 21 identifies the model of the aircraft P in the route R. In a case in which the aircraft recognition unit 12 does not recognize presence of the aircraft Q in the image G but the duration calculation value calculated by the noise duration calculation unit 15 exceeds the duration threshold in the determination by the noise duration determination unit 16, the image-type model identification unit 21 identifies the model of the aircraft P in the route R. In this case, the image-type model identification unit 21 may identify the model of the aircraft P in the route R with use of the image G acquired from a time point when the noise level acquisition value is maximum to a predetermined time.

As shown in FIG. 5 and FIG. 6, the image-type information identification unit 20 includes an image-type direction identification unit 22 that identifies a moving direction D of the aircraft P in the flight route R based on a direction of a noise q2 of the aircraft Q in the image G acquired by the image acquisition unit 11. The image-type direction identification unit 22 may include a noise extraction unit 22a that extracts the noise q2 of the aircraft Q in the image G, and a direction estimation unit 22b that estimates a direction of a noise of the aircraft P in the flight route R based on the noise q2 extracted by the noise extraction unit 22a. In particular, such an image-type direction identification unit 22 may be configured to identify either of a takeoff direction D1 in which the aircraft P in the flight route R is directed to a direction separating from the takeoff runway A1, and a landing direction D2 in which the aircraft P in the flight route R is directed to a direction approaching the landing runway A1.

Note that the image-type direction identification unit may identify the moving direction of the aircraft in the flight route based on the direction of the noise of the aircraft in the plurality of images acquired by the image acquisition unit. In this case, the moving direction of the aircraft in the flight route may be identified based on an image that is the highest in matching rate between the appearance data and the appearance sample in the identification by the image-type model identification unit 21 among the plurality of images.

Furthermore, the image-type direction identification unit may be configured to identify the moving direction of the aircraft in the flight route based on the positional difference of the aircraft among the plurality of images, in particular, between the two images acquired by the image acquisition unit. In this case, the image-type direction identification unit may include a positional difference calculation unit that calculates the positional difference of the aircraft among the plurality of images, and a direction estimation unit that estimates the moving direction of the aircraft in the flight route based on the calculation result of the positional difference calculated by the positional difference calculation unit.

The image-type direction identification unit 22 can be configured by a learned artificial intelligence model. In this case, the learned artificial intelligence model can be constructed by inputting test samples such as the plurality of appearance samples prescribed for the respective models, and/or the like, as learning data. Note that, in a case of using the learned artificial intelligence model, additional test samples may be input to the learned artificial intelligence model, and the identification condition of the moving direction may be accordingly corrected.

Furthermore, in the case in which the aircraft recognition unit 12 recognizes presence of the aircraft Q in the image G, the image-type direction identification unit 22 identifies the moving direction D of the aircraft P in the flight route R. In the case in which the aircraft recognition unit 12 does not recognize presence of the aircraft Q in the image G but the duration calculation value calculated by the noise duration calculation unit 15 exceeds the duration threshold in the determination by the noise duration determination unit 16, the image-type direction identification unit 22 identifies the moving direction D of the aircraft P in the flight route R. In this case, the image-type direction identification unit 22 may identify the moving direction D of the aircraft P in the flight route R with use of the image G acquired from the time point when the noise level acquisition value is maximum to a predetermined time.

As shown in FIG. 5 and FIG. 6, the image-type information identification unit 20 includes an image-type affiliation identification unit 23 that is configured to identify affiliation of the aircraft P in the flight route R based on pattern data q3 appearing on the surface of the aircraft Q in the image G acquired by the image acquisition unit 11, and pattern samples on the surfaces of the aircraft previously prescribed for respective affiliations of the aircraft. In the image-type affiliation identification unit 23, a plurality of pattern samples previously prescribed for the respective affiliations may be used in order to identify the plurality of affiliations. More specifically, the image-type affiliation identification unit 23 collates the pattern data q3 of the aircraft Q in the image G with the plurality of pattern samples. The image-type affiliation identification unit 23 may identify affiliation corresponding to a pattern sample high in matching rate with the pattern data q3 in the collation, as the affiliation of the aircraft P in the flight route R.

In a case in which the pattern samples previously prescribed for the respective affiliations do not include a pattern sample matching with the pattern data q3 of the aircraft Q or only include a pattern sample extremely low in matching rate with the pattern data q3 of the aircraft Q, the image-type affiliation identification unit 23 may identify the model of the aircraft P in the flight route R, as an "affiliation undetermined aircraft". Note that the image-type affiliation identification unit may identify the affiliation of the aircraft in the flight route based on the pattern data of the aircraft in the plurality of images acquired by the image acquisition unit and the aircraft pattern samples previously prescribed for the respective affiliations. In this case, the affiliation of the aircraft in the flight route may be identified based on an image that is the highest in matching rate between the pattern data and the pattern sample among the plurality of images. Such an image-type affiliation identification unit 23 may include a pattern collation unit 23*a* that collates the pattern data q3 with the pattern samples, and an affiliation estimation unit 23*b* that estimates affiliation of the aircraft P in the flight route R based on a result of the collation by the pattern collation unit 23*a*.

Such an image-type affiliation identification unit 23 can be configured by a learned artificial intelligence model. In this case, the learned artificial intelligence model can be constructed by inputting test samples such as the plurality of pattern samples prescribed for the respective affiliations, and/or the like, as learning data. Note that, in a case of using the learned artificial intelligence model, additional test samples may be input to the learned artificial intelligence model, and the matching condition between the pattern data and the pattern sample may be accordingly corrected.

Furthermore, in the case in which the aircraft recognition unit 12 recognizes presence of the aircraft Q in the image G, the image-type affiliation identification unit 23 identifies the affiliation of the aircraft P in the flight route R. In the case in which the aircraft recognition unit 12 does not recognize presence of the aircraft Q in the image G but the duration calculation value calculated by the noise duration calculation unit 15 exceeds the duration threshold in the determination by the noise duration determination unit 16, the image-type affiliation identification unit 23 identifies the affiliation of the aircraft P in the flight route R. In this case, the image-type affiliation identification unit 23 may identify the affiliation of the aircraft P in the flight route R with use of the image G acquired from the time point when the noise level acquisition value is maximum to a predetermined time.

As shown in FIG. 5 and FIG. 6, the image-type information identification unit 20 includes an image-type deformation mode identification unit 24 that is configured to identify the deformation mode of the aircraft P in the flight route R based on the contour data q1 of the aircraft Q in the image G acquired by the image acquisition unit 11 and aircraft contour samples previously prescribed for respective deformation modes. In the image-type deformation mode identification unit 24, the plurality of contour samples previously prescribed for the respective deformation modes may be used in order to identify the plurality of deformation modes. More specifically, the image-type deformation mode identification unit 24 collates the contour data q1 of the aircraft Q in the image G with the plurality of contour samples. The image-type deformation mode identification unit 24 may identify a deformation mode corresponding to the contour sample highest in matching rate with the contour data q1, as the deformation mode of the aircraft P in the flight route R.

Note that the image-type deformation mode identification unit may identify the deformation mode of the aircraft in the flight route based on the aircraft contour data in the plurality of images acquired by the image acquisition unit and the aircraft contour samples previously prescribed for the respective deformation modes. In this case, the deformation mode of the aircraft in the flight route may be identified based on an image that is the highest in matching rate between the contour data and the contour sample among the plurality of images. Such an image-type deformation mode identification unit 24 may include a contour collation unit 24*a* that collates the contour data q1 with the contour samples, and a deformation mode estimation unit 24*b* that estimates the deformation mode of the aircraft P in the flight route R based on a result of the collation by the contour collation unit 24*a*.

Such an image-type deformation mode identification unit 24 can be configured by a learned artificial intelligence model. In this case, the learned artificial intelligence model can be constructed by inputting test samples such as the plurality of contour samples prescribed for the respective deformation modes, and/or the like, as learning data. Note that, in a case of using the learned artificial intelligence model, additional test samples may be input to the learned artificial intelligence model, and a matching condition between the contour data and the contour sample may be accordingly corrected.

Furthermore, in the case in which the aircraft recognition unit 12 recognizes presence of the aircraft Q in the image G, the image-type deformation mode identification unit 24 identifies the deformation mode of the aircraft P in the flight route R. In the case in which the aircraft recognition unit 12 does not recognize presence of the aircraft Q in the image G but the duration calculation value calculated by the noise duration calculation unit 15 exceeds the duration threshold in the determination by the noise duration determination unit 16, the image-type deformation mode identification unit 24 identifies the deformation mode of the aircraft P in the flight route R. In this case, the image-type deformation mode identification unit 24 may identify the deformation mode of the aircraft P in the route R with use of the image G acquired from the time point when the noise level acquisition value is maximum to a predetermined time.

As shown in FIG. 6, the image-type information identification unit 20 includes a number-of-aircraft identification unit 25 that is configured to identify the number of aircraft Q in the image G. In the case in which the aircraft recognition unit 12 recognizes presence of the aircraft Q in the image G, the number-of-aircraft identification unit 25 identifies the number of aircraft P in the flight route R. In the case in which the aircraft recognition unit 12 does not recognize presence of the aircraft Q in the image G but the duration calculation value calculated by the noise duration calculation unit 15 exceeds the duration threshold in the determination by the noise duration determination unit 16, the number-of-aircraft identification unit 25 identifies the number of aircraft P in the flight route R. In this case, the number-of-aircraft identification unit 25 may identify the number of aircraft P in the flight route R with use of the image G acquired from the time point when the noise level acquisition value is maximum to a predetermined time.

Figure 7:
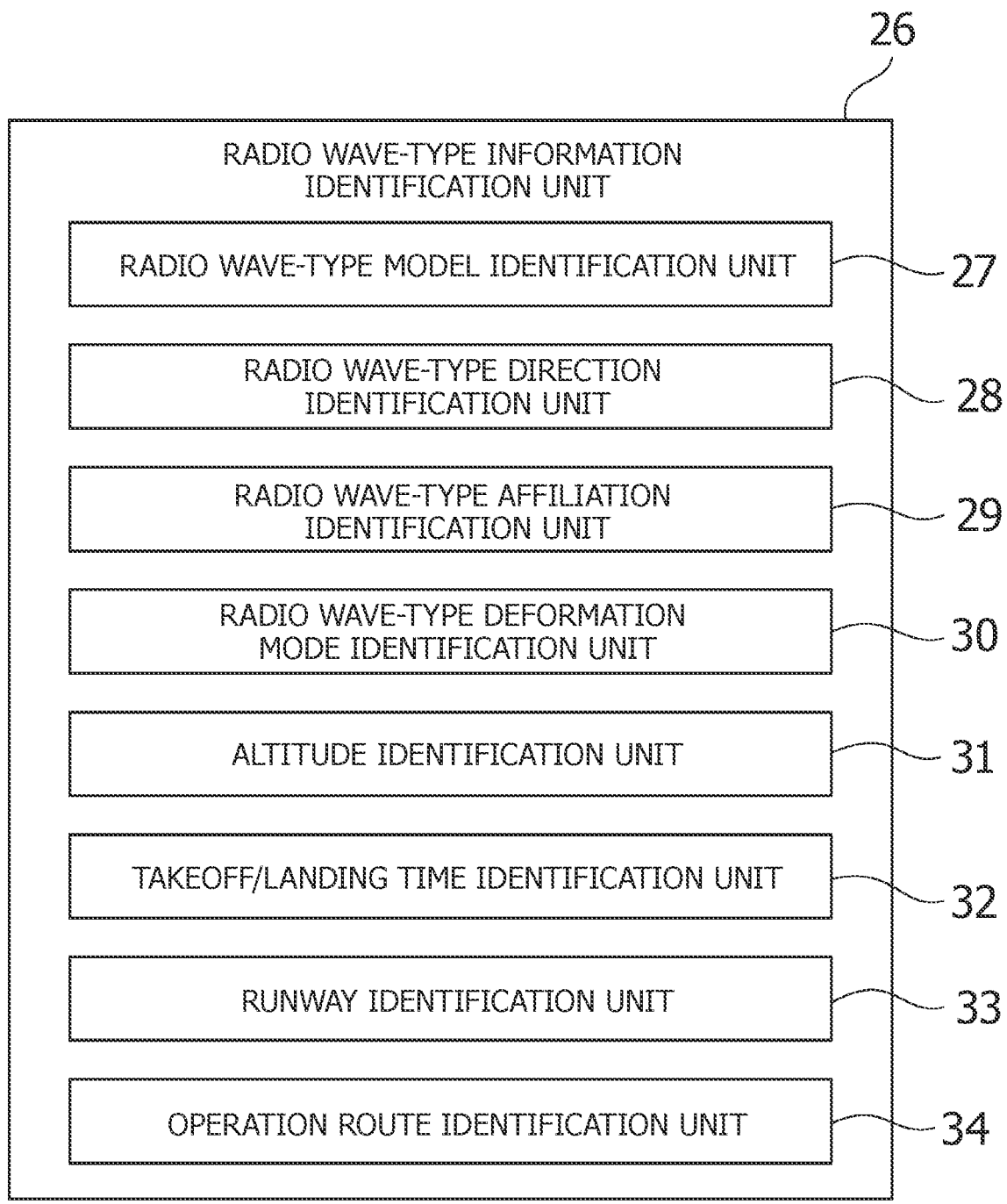
FIG. 7 is a configuration diagram of a radio wave-type information identification unit in the collection device according to the First Embodiment.

As shown in FIG. 2 and FIG. 7, the collection device 2 includes a radio wave-type information identification unit 26 that is configured to identify various kinds of information based on the received radio wave signal. As shown in FIG. 7, the radio wave-type information identification unit 26 includes a radio wave-type model identification unit 27 that is configured to identify the model of the aircraft P in the flight route R based on the received radio wave signal. Model identification information included in the received radio wave signal may be airframe number information specific to the aircraft P in the flight route R. In this case, the radio wave-type model identification unit 27 may identify the model and the airframe number of the aircraft P in the flight route R based on the airframe number information.

The radio wave-type information identification unit 26 includes a radio wave-type direction identification unit 28 that is configured to identify the moving direction D of the aircraft P in the flight route R based on the received radio wave signal. In particular, the radio wave-type direction identification unit 28 may be configured to identify either of the takeoff direction D1 and the landing direction D2. The radio wave-type information identification unit 26 includes a radio wave-type affiliation identification unit 29 that is configured to identify the affiliation of the aircraft P in the flight route R based on the received radio wave signal. The radio wave-type information identification unit 26 further includes a radio wave-type deformation mode identification unit 30 that is configured to identify the deformation mode of the aircraft P in the flight route R based on the received radio wave signal.

The radio wave-type information identification unit 26 includes an altitude identification unit 31 that is configured to identify a flight altitude of the aircraft P in the flight route R based on the received radio wave signal. The radio wave-type information identification unit 26 includes a takeoff/landing time identification unit 32 that is configured to identify a takeoff time and a landing time of the aircraft P in the flight route R based on the received radio wave signal. The radio wave-type information identification unit 26 includes a runway identification unit 33 that is configured to identify a runway used by the aircraft P in the flight route R based on the received radio wave signal. In particular, identification of the used runway by the runway identification unit is effective in a case in which the collection device collects operation history information on the plurality of aircraft using different runways. The radio wave-type information identification unit 26 includes an operation route identification unit 34 that is configured to identify an operation route of the aircraft P based on the received radio wave signal.

Figure 8:
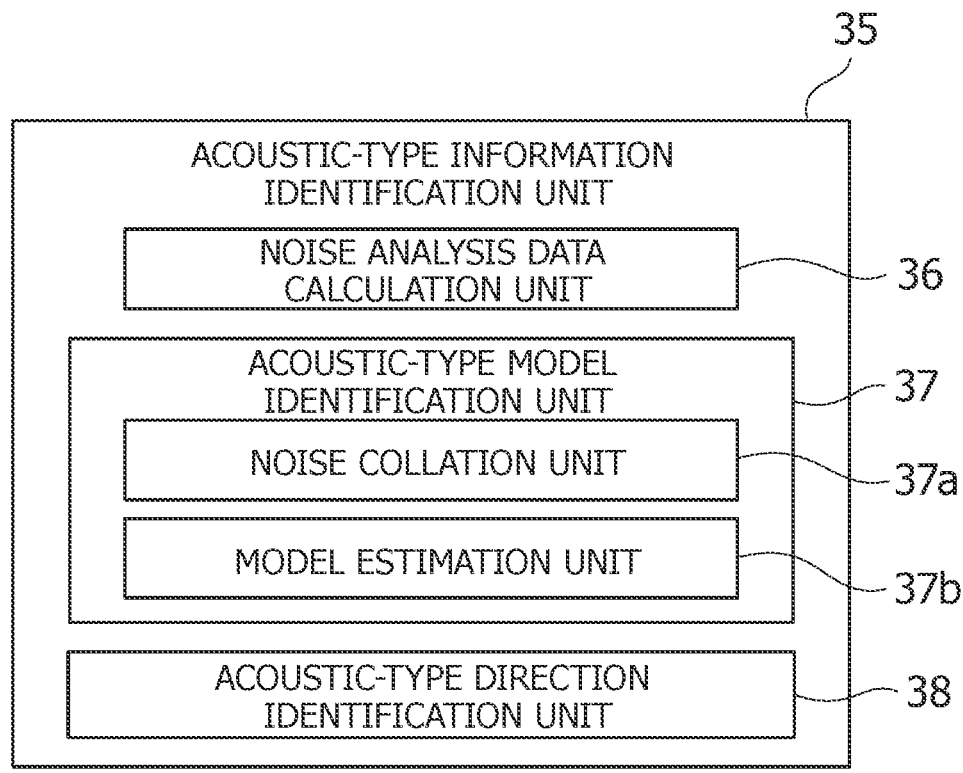
FIG. 8 is a configuration diagram of an acoustic-type information identification unit in the collection device according to the First Embodiment.

As shown in FIG. 2 and FIG. 8, the collection device 2 includes an acoustic-type information identification unit 35 that is configured to identify various kinds of information based on the noise level acquisition value acquired by the noise acquisition unit 13 or the acoustic intensity calculation value (acoustic intensity acquisition value) acquired by the acoustic intensity acquisition unit 17. As shown in FIG. 8, the acoustic-type information identification unit 35 includes a noise analysis data calculation unit 36 that calculates noise analysis data by converting a frequency of the noise level acquisition value acquired by the noise acquisition unit 13.

The acoustic-type information identification unit 35 further includes an acoustic-type model identification unit 37 that is configured to identify the model of the aircraft P in the flight route R based on the noise analysis data calculated by the noise analysis data calculation unit 36 and aircraft noise analysis samples previously prescribed for the respective models. More specifically, the acoustic-type model identification unit 37 collates the noise analysis data with the plurality of noise analysis samples. The acoustic-type model identification unit 37 may identify a model corresponding to the noise analysis sample highest in matching rate with the noise analysis data in the collation, as the model of the aircraft P in the flight route R. Such an acoustic-type model identification unit 37 may include a noise collation unit 37a that collates the noise analysis data with the noise analysis samples, and a model estimation unit 37b that estimates the model of the aircraft P in the flight route R based on a result of the collation by the noise collation unit 37a.

Such an acoustic-type model identification unit 37 can be configured by a learned artificial intelligence model. In this case, the learned artificial intelligence model can be constructed by inputting test samples such as the plurality of noise analysis samples prescribed for the respective models, and/or the like, as learning data. Note that, in a case of using the learned artificial intelligence model, additional test samples may be input to the learned artificial intelligence model, and a matching condition between the noise analysis data and the noise analysis sample may be accordingly corrected.

Furthermore, in the case in which the duration calculation value calculated by the noise duration calculation unit 15 exceeds the duration threshold in the determination by the noise duration determination unit 16, the acoustic-type model identification unit 37 may identify the model of the aircraft P in the flight route R.

The acoustic-type information identification unit 35 includes an acoustic-type direction identification unit 38 that is configured to identify the moving direction D of the aircraft P in the flight route R based on the acoustic intensity acquisition value acquired by the acoustic intensity acquisition unit 17. In particular, the acoustic-type direction identification unit 38 may be configured to identify either of the takeoff direction D1 and the landing direction D2.

As shown in FIG. 2, the collection device 2 includes a sound source search-type direction identification unit 39 that is configured to identify the moving direction D of the aircraft P in the flight route R based on the sound source direction information acquired by the sound source direction acquisition unit 19. In particular, the sound source search-type direction identification unit 39 may be configured to identify either of the takeoff direction D1 and the landing direction D2.

Referring to FIG. 2 and FIG. 6 to FIG. 8, the collection device 2 may include a model selection unit 40 that is configured to select model information from at least one of image-derived model information identified by the image-type model identification unit 21, radio wave-derived model information identified by the radio wave-type model identification unit 27, and acoustic-derived model information identified by the acoustic-type model identification unit 37. For example, in a case in which the radio wave acquisition unit 18 acquires the received radio wave signal, the model selection unit 40 can select the radio wave-derived model information from the image-derived model information, the radio wave-derived model information, and optionally the acoustic-derived model information. In this case, the image-type model identification unit and the acoustic-type model identification unit may not identify the model of the aircraft in the flight route.

The model selection unit 40 can select the model information from the image-derived model information and the acoustic-derived model information based on the highest one of the matching rate between the appearance data and the appearance sample in the image-derived model information and the matching rate between the noise analysis data and the noise analysis sample in the acoustic-derived model information. In particular, such model selection by the model selection unit 40 may be performed in the case in which the radio wave acquisition unit 18 does not acquire the received radio wave signal.

Referring to FIG. 2 and FIG. 6 to FIG. 8, the collection device 2 may include a moving direction selection unit 41 that selects direction information from at least one of image-derived direction information E identified by the image-type direction identification unit 22, radio wave-derived direction information identified by the radio wave-type direction identification unit 28, acoustic-derived direction information identified by the acoustic-type direction identification unit 38, and sound source search-derived direction information identified by the sound source-type direction identification unit 39. In particular, the moving direction selection unit 41 may select the takeoff and landing direction information from at least one of image-derived takeoff and landing direction information E1 and E2 identified by the image-type direction identification unit 22, radio wave-derived takeoff and landing direction information identified by the radio wave-type direction identification unit 28, acoustic-derived takeoff and landing direction information identified by the acoustic-type direction identification unit 38, and sound source search-derived takeoff and landing direction information identified by the sound source search-type direction identification unit 39.

For example, in the case in which the radio wave acquisition unit 18 acquires the received radio wave signal, the moving direction selection unit 41 can select the radio wave-derived direction information from the image-derived direction information E and the radio wave-derived direction information, and optionally the acoustic-derived direction information and the sound source search-derived direction information. Furthermore, the moving direction selection unit 41 also can select the direction information from at least one of the image-derived direction information, the acoustic-derived direction information, and the sound source search-derived direction information based on the identification condition of at least one of the image-type direction identification unit 22, the acoustic-type direction identification unit 38, and the sound source search-type direction identification unit 39. Such direction selection by the moving direction selection unit 41 may be performed in the case in which the radio wave acquisition unit 18 does not acquire the received radio wave signal.

Referring to FIG. 2, FIG. 6, and FIG. 7, the collection device 2 may include an affiliation selection unit 42 that is configured to select the affiliation information from image-derived affiliation information identified by the image-type affiliation identification unit 23 and radio wave-derived affiliation information identified by the radio wave-type affiliation identification unit 29. The affiliation selection unit 42 may select the image-derived affiliation information in the case in which the radio wave acquisition unit 18 does not acquire the received radio wave signal, and selects the radio wave-derived affiliation information in the case in which the radio wave acquisition unit 18 acquires the received radio wave signal.

The collection device 2 may include a deformation mode selection unit 43 that is configured to select the deformation mode information from image-derived deformation mode information identified by the image-type deformation mode identification unit 24 and radio wave-derived deformation mode information identified by the radio wave-type deformation mode identification unit 30. The deformation mode selection unit 43 may select the image-derived deformation mode information in the case in which the radio wave acquisition unit 18 does not acquire the received radio wave signal, and selects the radio wave-derived deformation mode information in the case in which the radio wave acquisition unit 18 acquires the received radio wave signal.

Referring to FIG. 2 and FIG. 6 to FIG. 8, the collection device 2 includes a passage time identification unit 44 that identifies a passage time of the aircraft P in the flight route R. In the case in which the aircraft recognition unit 12 recognizes presence of the aircraft Q in the image G, the passage time identification unit 44 identifies a time thereof. In the case in which the aircraft recognition unit 12 does not recognize presence of the aircraft Q in the image G but the duration calculation value calculated by the noise duration calculation unit 15 exceeds the duration threshold in the determination by the noise duration determination unit 16, the passage time identification unit 44 may identify a time thereof. Furthermore, in the case in which the radio wave acquisition unit 18 acquires the reception radio wave signal, the passage time identification unit 44 may preferentially identify a time thereof.

The collection device 2 includes an operation history storage unit 45 that is configured to store the image-derived model information. The operation history storage unit 45 can store selected model information selected by the model selection unit 40 in place of the image-derived model information. In this case, information described below stored in the operation history storage unit 45 is associated with the selected model information in place of the image-derived model information.

The operation history storage unit 45 stores the image-derived direction information E in association with the image-derived model information. Note that, in place of the image-derived direction information E, the operation history storage unit 45 may store the selected direction information selected by the moving direction selection unit 41, in a condition in which the selected direction information is associated with the image-derived model information.

In particular, the operation history storage unit 45 may store the image-derived takeoff and landing direction information E1 and E2 in association with the image-derived model information. Note that the operation history storage unit 45 may store the selected takeoff and landing direction information selected by the moving direction selection unit 41, in a condition in which the selected takeoff and landing direction information is associated with the image-derived model information.

The operation history storage unit 45 can store the image-derived affiliation information in association with the image-derived model information. Note that, in place of the image-derived affiliation information, the operation history storage unit 45 may store selected affiliation information selected by the affiliation selection unit 42, in a condition in which the selected affiliation information is associated with the image-derived model information.

The operation history storage unit 45 can store the image-derived deformation mode information in association with the image-derived model information. Note that, in place of the image-derived deformation mode information, the operation history storage unit 45 may store selected deformation mode information selected by the deformation mode selection unit 43, in a condition in which the selected deformation mode information is associated with the image-derived model information.

The operation history storage unit 45 can store the image G acquired by the image acquisition unit 11, in association with the image-derived model information. The operation history storage unit 45 can store number-of-aircraft information identified by the number-of-aircraft identification unit 25, in a condition in which the number-of-aircraft information is associated with the image-derived model information.

The operation history storage unit 45 can store the flight altitude information identified by the altitude identification unit 31, in a condition in which the flight altitude information is associated with the image-derived model information. The operation history storage unit 45 can store the takeoff time information or the landing time information identified by the takeoff/landing time identification unit 32, in a condition in which the takeoff time information or the landing time information is associated with the image-derived model information. The operation history storage unit 45 can store the used runway information identified by the runway identification unit 33, in a condition in which the used runway information is associated with the image-derived model information. The operation history storage unit 45 can store the operation route estimated by the operation route identification unit 34, in a condition in which the operation route is associated with the image-derived model information.

As described above, the various kinds of information stored in the operation history storage unit 45 may be output to the output device such as a display, a printer, and/or the like, or the input/output device such as a touch panel and/or the like while being summarized in, for example, a table and/or the like.

Referring to FIG. 2 and FIG. 6, the collection device 2 includes a passage frequency calculation unit 46 that calculates passage frequency of the aircraft P in the flight route R based on the image-derived model information when the image-type model identification unit 21 identifies the model and the same model information already stored in the operation history storage unit 45, namely, the same image-derived model information and/or the selected model information. Note that the passage frequency calculation unit 46 may calculate the passage frequency of the aircraft P in the flight route R based on the selected model information when the model selection unit 40 selects the selected model information and the same model information already stored in the operation history storage unit 45, namely, the same image-derived model information and/or the selected model information. The operation history storage unit 45 can store a passage frequency calculation value calculated by the passage frequency calculation unit 46, in a condition in which the passage frequency calculation value is associated with the image-derived model information.

The collection device 2 includes an incoming frequency calculation unit 47 that calculates incoming frequency of the same model based on a preset collection target period and the passage frequency calculation value within the collection target period. More specifically, the incoming frequency calculation unit 47 calculates incoming frequency that is a ratio of the passage frequency calculation value within the collection target period to the collection target period. Such a collection target period is a period from a preset start time to a preset end time, and is defined by setting such start time and end time. A length of the collection target period may be set to, for example, one hour, one day, one week, one month, one year, or the like from the predetermined start time. The operation history storage unit 45 can store the incoming frequency calculation value calculated by the incoming frequency calculation unit 47, in a condition in which the incoming frequency calculation value is associated with the image-derived model information.

"Method of Collecting Aircraft Operation History Information"

Figure 9:
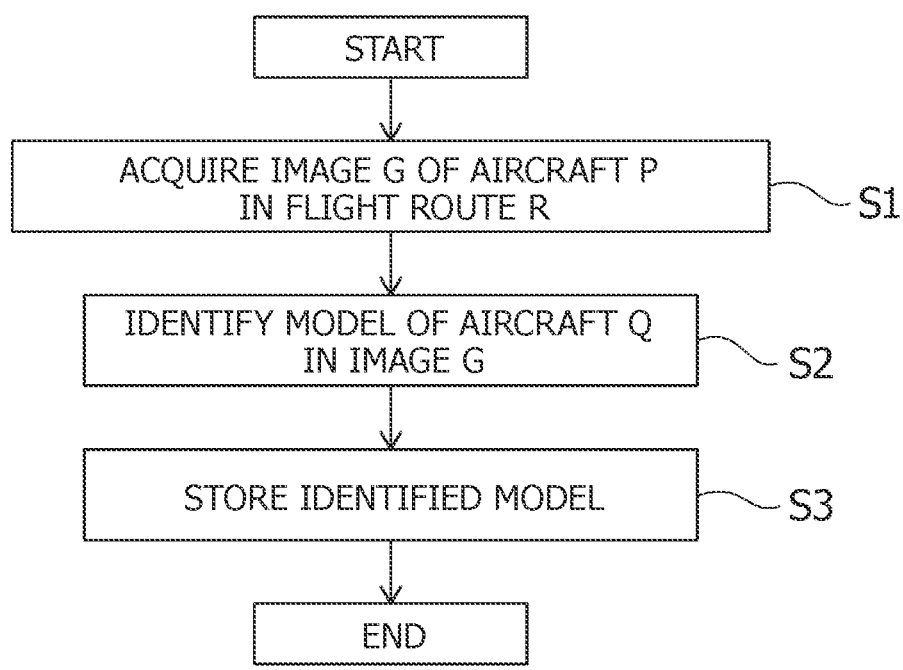
FIG. 9 is a flowchart showing a major example of a method of collecting the aircraft operation history information according to the First Embodiment.

A major example of the method of collecting the operation history information on the aircraft P by the collection device 2 according to the present Embodiment is described with reference to FIG. 9. The image G obtained by imaging the aircraft P in the flight route R is acquired (step S1). The model of the aircraft P in the flight route R is identified based on the appearance data of the aircraft Q in the image G and the aircraft appearance samples previously prescribed for the respective models (step S2). The image identification model is stored (step S3).

As described above, the collection device 2 according to the present Embodiment includes: the image acquisition unit 11 that is configured to acquire the image G obtained by imaging the flight route R; the image-type model identification unit 21 that is configured to identify the model of the aircraft P in the flight route R based on the appearance data of the aircraft Q in the image G acquired by the image acquisition unit 11 and the aircraft appearance samples previously prescribed for the respective models; and the operation history storage unit 45 that is configured to store the image-derived model information identified by the image-type model identification unit 21. Accordingly, even in a case in which the aircraft P that does not transmit a radio wave such as a transponder response signal radio wave and/or the like passes through the flight route R, it is possible to collect the model information continuously, for example, for 24 hours. Accordingly, it is possible to collect the operation history information on all of the aircraft P and to improve efficiency in collection of the operation history information on the aircraft P.

The collection device 2 according to the present Embodiment further includes the image-type direction identification unit 22 configured to identify the moving direction D of the aircraft in the flight route R based on the direction of the noise q2 of the aircraft Q in the image G acquired by the image acquisition unit 11 or the positional difference of aircraft in the plurality of images. The operation history storage unit 45 further stores the image-derived direction information identified by the image-type direction identification unit 22, in a condition in which the image-derived direction information is associated with the image-derived model information. Accordingly, even in the case in which the aircraft P that does not transmit a radio wave such as a transponder response signal radio and/or the like wave passes through the flight route R, it is possible to efficiently collect the moving direction information on the aircraft P in addition to the model information on the aircraft P.

The collection device 2 according to the present Embodiment further includes the image-type affiliation identification unit 23 configured to identify the affiliation of the aircraft P in the flight route R based on the pattern data q3 appearing on the surface of the aircraft Q in the image G acquired by the image acquisition unit 11 and the pattern samples on the surfaces of the aircraft previously prescribed for the respective affiliations of the aircraft. The operation history storage unit 45 further stores the image-derived affiliation information identified by the image-type affiliation identification unit 23, in a condition in which the image-derived affiliation information is associated with the image-derived model information. Accordingly, even in the case in which the aircraft P that does not transmit a radio wave such as a transponder response signal radio wave and/or the like passes through the flight route R, it is possible to efficiently collect the affiliation information on the aircraft P in addition to the model information on the aircraft P.

The collection device 2 according to the present Embodiment further includes the image-type deformation mode identification unit 24 configured to identify the deformation mode of the aircraft P in the flight route R based on the contour data q1 of the aircraft Q in the image G acquired by the image acquisition unit 11 and the aircraft contour samples previously prescribed for the respective deformation modes. The operation history storage unit 45 further stores the image-derived deformation mode information identified by the image-type deformation mode identification unit 24, in a condition in which the image-derived deformation mode information is associated with the image-derived model information. Accordingly, even in the case in which the aircraft P that does not transmit a radio wave such as a transponder response signal radio wave and/or the like passes through the flight route R, it is possible to efficiently collect the deformation mode information on the aircraft P in addition to the model information on the aircraft P.

The collection device 2 according to the present Embodiment further includes the passage frequency calculation unit 46 configured to calculate the passage frequency of the aircraft P in the flight route R based on the image-derived model information identified by the image-type model identification unit 21 and the image-derived model information already stored in the operation history storage unit 45. The operation history storage unit 45 further stores the passage frequency information calculated by the passage frequency calculation unit 46, in a condition in which the passage frequency information is associated with the image-derived model information. Accordingly, even in the case in which the aircraft P that does not transmit a radio wave such as a transponder response signal radio wave and/or the like passes through the flight route R, it is possible to efficiently collect the passage frequency information on the aircraft P in addition to the model information on the aircraft P.

The collection device 2 according to the present Embodiment further includes the aircraft recognition unit 12 configured to recognize presence of the aircraft Q in the image G acquired by the image acquisition unit 11. The image-type direction identification unit 22 identifies the model of the aircraft Q in the flight route R in the case in which the aircraft recognition unit 12 recognizes presence of the aircraft Q in the image G. Accordingly, even in the case in which the aircraft P that does not transmit a radio wave such as a transponder response signal radio wave and/or the like passes through the flight route R, it is possible to surely collect the model information on the aircraft P.

The collection device 2 according to the present Embodiment further includes: the radio wave acquisition unit 18 configured to acquire the radio wave signal transmitted from the aircraft P in the flight route R; and the radio wave-type model identification unit 27 configured to, in the case in which the radio wave acquisition unit 18 acquires the radio wave of the aircraft P in the flight route R, identify the model of the aircraft P in the flight route R based on the radio wave signal. The operation history storage unit 45 stores the radio wave-derived model information identified by the radio wave-type model identification unit 27 in place of the image-derived model information in the case in which the radio wave acquisition unit 18 acquires the radio wave of the aircraft P in the flight route R. Accordingly, in a case in which the aircraft P that transmits a radio wave such as a transponder response signal radio wave passes and/or the like through the flight route R, the radio wave-derived model information with high accuracy is collected. This makes it possible to efficiently collect the model information on the aircraft P.

The collection device 2 according to the present Embodiment further includes: the noise acquisition unit 13 configured to acquire the noise level from the aircraft P in the flight route R; the noise analysis data calculation unit 36 configured to calculate the noise analysis data by converting the frequency of the noise level acquisition value acquired by the noise acquisition unit 13; and the acoustic-type model identification unit 37 configured to identify the model of the aircraft P in the flight route R based on the noise analysis data calculated by the noise analysis data calculation unit 36 and the aircraft noise analysis samples previously prescribed for the respective models. The operation history storage unit 45 stores the acoustic-derived model information identified by the acoustic-type model identification unit 37 in place of the image-derived model information. Accordingly, for example, in a case in which the identification accuracy of the acoustic-derived model information is higher than the identification accuracy of the image-derived model information, storing the acoustic-derived model information in place of the image-derived model information makes it possible to more efficiently collect the model information on the aircraft P.

The collection device 2 according to the present Embodiment further includes: the noise acquisition unit 13 configured to acquire the noise level from the aircraft P in the flight route R; and the predominant noise time calculation unit 14 configured to, in the case in which the predominant noise state in which the noise level acquisition value acquired by the noise acquisition unit 13 exceeds the noise level threshold occurs, calculate the duration of the predominant noise state. The image-type model identification unit 21 is configured to identify the model of the aircraft P in the flight route R in the case in which the aircraft recognition unit 12 does not recognize presence of the aircraft Q in the image G but the duration calculation value calculated by the predominant noise time calculation unit 14 exceeds the duration threshold. Accordingly, even in a case in which presence of the aircraft Q is missed in the image G, it is possible to surely collect the model information on the aircraft P.

In the collection device 2 according to the present Embodiment, the image-type direction identification unit 22 is configured to identify either of the takeoff direction D1 in which the aircraft P in the flight route R separates from the takeoff runway A1, and the landing direction D2 in which the aircraft P in the flight route R approaches the landing runway A1. Accordingly, even in the case in which the aircraft P that does not transmit a radio wave such as a transponder response signal radio wave and/or the like passes through the flight route R, it is possible to efficiently collect information indicating whether or not the aircraft P is in the takeoff state or in the landing state, in addition to the model information on the aircraft P.

Second Embodiment

A collection system according to a Second Embodiment is described. The collection system according to the present Embodiment is the same as the collection system according to the First Embodiment except for matters described below. Note that a method of collecting the aircraft operation history information according to the present Embodiment is similar to the method of collecting the aircraft operation history information according to the First Embodiment. Therefore, description of the method is omitted.

As shown in FIG. 1, a collection system 51 according to the present Embodiment includes the collection device 2, the noise detection device 4, and the radio wave reception device 5 that are the same as those according to the First Embodiment. The collection system 51 includes the imaging device 3 which is the same as the imaging device 3 according to the First Embodiment except for the imaging direction 3a.

The collection system 51 is installed so as to collect operation information on the aircraft P passing through a taxiway A2 on the ground. For example, the collection system 51 may be installed near the taxiway A2 that extends substantially linearly and substantially parallel to the runway A1. More specifically, the collection system 51 is installed at a position separated from the taxiway A2 on one side in a width direction of the taxiway A2. In particular, the collection system 51 may be installed at a position separated from the taxiway A2 on a side opposite to the runway A1 in the width direction of the taxiway A2. The imaging direction 3a of the imaging device 3 may be substantially parallel to the ground and may be directed to the taxiway A2.

As described above, the collection system 51 according to the present Embodiment can achieve effects which are the same as the effects by the collection system 1 according to the First Embodiment except for an effect based on collection of the operation information on the aircraft P passing through the taxiway A2 in place of the flight route R. Furthermore, the collection system 51 according to the present Embodiment can collect deployment information on the aircraft P deployed in a ground facility such as an airport, a base, and/or the like in the taxiway A2 inside the ground facility. In particular, the image G at the position from which the taxiway A2 can be seen is used, which makes it possible to collect the operation information on the aircraft P on the ground, for example, information on a parking place for each model, a taxiing moving route, and/or the like.

Although the Embodiments of the present invention have been described above, the present invention is not limited to the above-described Embodiments, and the present invention can be modified and altered based on the technical idea thereof.

REFERENCE SIGNS LIST 1, 51 Collection system
2 Collection device
11 Image acquisition unit, 12 Aircraft recognition unit, 13 Noise acquisition unit, Predominant noise determination unit, 15 Noise duration calculation unit, 18 Radio wave acquisition unit
21 Image-type model identification unit, 22 Image-type direction identification unit, 23 Image-type affiliation identification unit, 24 Image-type deformation mode identification unit, 27 Radio wave-type model identification unit, 36 Noise analysis data calculation unit, 37 Acoustic-type model identification unit, 45 Operation history storage unit, 46 Passage frequency calculation unit
G Image, Q Aircraft, q1 Contour data, q2 Noise, q3 Pattern data, E Image-derived direction information, E1 Image-derived takeoff direction information, E2 Image-derived landing direction information
A1 Runway, A2 Taxiway (Route), P Aircraft, R Flight route (Route), D Moving direction, D1 Takeoff direction, D2 Landing direction

The invention claimed is:

1. A device configured to collect aircraft operation history information, the device comprising:
an image acquisition unit configured to acquire an image obtained by imaging a specific route;
an image-type model identification unit configured to identify a model of an aircraft in the route based on appearance data of an aircraft in the image acquired by the image acquisition unit and on aircraft appearance samples previously prescribed for respective models, the image-type model identification unit being configured by a learned artificial intelligence model;
an operation history storage unit configured to store image-derived model information identified by the image-type model identification unit; and
a passage frequency calculation unit configured to calculate passage frequency of the aircraft in the route based on: the image-derived model information identified by the image-type model identification unit; and the image-derived model information already stored in the operation history storage unit,
wherein the operation history storage unit is configured to further store passage frequency information calculated by the passage frequency calculation unit, in a condition in which the passage frequency information is associated with the image-derived model information, and wherein the device further comprises an incoming frequency calculation unit that calculates an incoming frequency of the aircraft in the route based on a preset collection target period and a passage frequency calculation value within a collection target period.

2. The device according to claim 1, further comprising:
an image-type direction identification unit configured to identify a moving direction of the aircraft in the route based on a direction of a noise of the aircraft in the image acquired by the image acquisition unit or a positional difference of aircraft in a plurality of images, wherein
the operation history storage unit is configured to further store image-derived direction information identified by the image-type direction identification unit, in a condition in which the image-derived direction information is associated with the image-derived model information.

3. The device according to claim 1, further comprising:
an image-type affiliation identification unit configured to identify affiliation of the aircraft in the route based on: pattern data appearing on a surface of the aircraft in the image acquired by the image acquisition unit; and pattern samples on surfaces of aircraft previously prescribed for respective affiliations of the aircraft, wherein
the operation history storage unit is configured to further store image-derived affiliation information identified by the image-type affiliation identification unit, in a condition in which the image-derived affiliation information is associated with the image-derived model information.

4. The device according to claim 1, further comprising:
an image-type deformation mode identification unit configured to identify a deformation mode of the aircraft in the route based on: contour data of the aircraft in the image acquired by the image acquisition unit; and aircraft contour samples previously prescribed for respective deformation modes, wherein
the operation history storage unit is configured to further store image-derived deformation mode information identified by the image-type deformation mode identification unit, in a condition in which the image-derived deformation mode information is associated with the image-derived model information.

5. The device according to claim 1, further comprising:
an aircraft recognition unit configured to recognize presence of the aircraft in the image acquired by the image acquisition unit, wherein
the image-type model identification unit is configured to identify the model of the aircraft in the route in a case in which the aircraft recognition unit recognizes presence of the aircraft in the image.

6. The device according to claim 1, further comprising:
a radio wave acquisition unit configured to acquire a radio wave signal transmitted from the aircraft in the route; and
a radio wave-type model identification unit configured to, in a case in which the radio wave acquisition unit acquires a radio wave of the aircraft in the route, identify the model of the aircraft in the route based on the radio wave signal acquired by the radio wave acquisition unit, wherein
the operation history storage unit is configured to store radio wave-derived model information identified by the radio wave-type model identification unit in place of the image-derived model information in the case in which the radio wave acquisition unit acquires a radio wave of the aircraft in the route.

7. The device according to claim 1, further comprising:
a noise acquisition unit configured to acquire a noise level from the aircraft in the route;
a noise analysis data calculation unit configured to calculate noise analysis data by converting a frequency of a noise level acquisition value acquired by the noise acquisition unit; and
an acoustic-type model identification unit configured to identify a model of the aircraft in the route based on: the noise analysis data calculated by the noise analysis data calculation unit; and
aircraft noise analysis samples previously prescribed for respective models, wherein the operation history storage unit is configured to store an acoustic-derived model information identified by the acoustic-type model identification unit in place of the image-derived model information.

8. The device according to claim 5, further comprising:
a noise acquisition unit configured to acquire a noise level from the aircraft in the route; and
a predominant noise time calculation unit configured to, in a case in which a predominant noise state occurs, calculate duration of the predominant noise state, the predominant noise state being a state in which the noise level acquisition value acquired by the noise acquisition unit exceeds a noise level threshold, wherein
the image-type model identification unit is configured to identify the model of the aircraft in the route in a case in which the aircraft recognition unit does not recognize presence of the aircraft in the image but a duration calculation value calculated by the predominant noise time calculation unit exceeds a duration threshold.

9. The device according to claim 2, wherein
the route is a flight route in air, and
the image-type direction identification unit is configured to identify either of a takeoff direction in which the aircraft in the route separates from a takeoff runway, and a landing direction in which the aircraft in the route approaches a landing runway.

10. The device according to claim 1, wherein
the route is a taxiway on ground.

* * * * *